(12) United States Patent
Ishibashi et al.

(10) Patent No.: US 12,021,448 B2
(45) Date of Patent: *Jun. 25, 2024

(54) CONTROL CIRCUIT FOR POWER CONVERTER APPARATUS PROVIDED WITH PFC CIRCUIT OPERATING IN CURRENT CRITICAL MODE

(71) Applicant: OMRON Corporation, Kyoto (JP)

(72) Inventors: Hiroki Ishibashi, Kyoto (JP); Hiroyuki Onishi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 214 days.

This patent is subject to a terminal disclaimer.

(21) Appl. No.: 17/628,692

(22) PCT Filed: Aug. 9, 2019

(86) PCT No.: PCT/JP2019/031654
§ 371 (c)(1),
(2) Date: Jan. 20, 2022

(87) PCT Pub. No.: WO2021/028972
PCT Pub. Date: Feb. 18, 2021

(65) Prior Publication Data
US 2022/0271650 A1 Aug. 25, 2022

(51) Int. Cl.
*H02M 1/42* (2007.01)
*H02M 1/00* (2006.01)
*H02M 7/219* (2006.01)

(52) U.S. Cl.
CPC ....... *H02M 1/4208* (2013.01); *H02M 1/0009* (2021.05); *H02M 1/0058* (2021.05);
(Continued)

(58) Field of Classification Search
CPC .... H02M 1/42; H02M 1/4208; H02M 1/4233; H02M 7/219; H02M 1/0058; H02M 1/0009
See application file for complete search history.

(56) References Cited

U.S. PATENT DOCUMENTS

2006/0061337 A1 3/2006 Kim et al.
2012/0092900 A1* 4/2012 Orr ..................... H02M 7/217
363/21.03
(Continued)

FOREIGN PATENT DOCUMENTS

WO 2011030640 A1 3/2011

OTHER PUBLICATIONS

Extended European Search Report corresponding to EP Application No. 19941248.7; dated Mar. 14, 2023.
(Continued)

*Primary Examiner* — Alex Torres-Rivera
(74) *Attorney, Agent, or Firm* — CANTOR COLBURN LLP

(57) ABSTRACT

A control circuit is provided for a power converter apparatus including a PFC circuit with an inductor and operating in a current critical mode. The control circuit includes: a first detector circuit that detects an inductor current, amplifies a voltage corresponding to a detected current with a gain, and outputs the voltage as a detected voltage; a comparator that compares the detected voltage with a reference voltage, and outputs a comparison result signal; a second detector circuit that detects an input voltage; and a third detector circuit that detects an output voltage. The control circuit calculates a reference voltage for making a delay on detecting zero value of the inductor current be substantially zero, based on the input voltage, the detected output voltage, a preset delay time, an inductance, a conversion coefficient on current-to-
(Continued)

voltage converting, a power supply voltage, and the gain, and outputs the reference voltage to the comparator.

5 Claims, 16 Drawing Sheets

(52) U.S. Cl.
CPC ....... *H02M 1/4225* (2013.01); *H02M 1/4233* (2013.01); *H02M 7/219* (2013.01)

(56) References Cited

U.S. PATENT DOCUMENTS

| | | |
|---|---|---|
| 2012/0155132 A1 | 6/2012 | Uno |
| 2013/0194842 A1* | 8/2013 | Bianco ................. H02M 3/156 363/84 |
| 2013/0308359 A1* | 11/2013 | Chen ................... H02M 1/4225 363/89 |
| 2015/0155778 A1* | 6/2015 | Kurokawa .............. H02M 1/42 323/235 |
| 2020/0403497 A1* | 12/2020 | Scappatura ......... H02M 1/4225 |

OTHER PUBLICATIONS

Kamal et al., "Noise mitigation and delay compensation in high frequency dual current programmed mode control" IEEE Applied Power Electronics Conference and Exposition (APEC), Mar. 4, 2018, pp. 3095-3101.

Huang et al., "Predictive ZVS Control With Improved ZVS Time Margin and Limited Variable Frequency Range for a 99% Efficient, 130-W/in3 MHz GaN Totem-Pole PFC Rectifier," IEEE Transactions on Power Electronics, vol. 34, No. 7, Jul. 2019; pp. 7079-7091.

International Search Report for International Application No. PCT/JP2019/031654; dated Oct. 15, 2019.

PCT Written Opinion of the International Searching Authority for International Application No. PCT/JP2019/031654; dated Oct. 15, 2019.

* cited by examiner

CONTROL CIRCUIT FOR POWER CONVERTER APPARATUS PROVIDED WITH PFC CIRCUIT OPERATING IN CURRENT CRITICAL MODE

CROSS REFERENCE TO RELATED APPLICATIONS

This is the U.S. national stage of application No. PCT/JP2019/031654, filed on Aug. 9, 2019. Priority is claimed and the disclosure of which is also incorporated herein by reference.

TECHNICAL FIELD

The present invention relates to a control circuit for a power converter apparatus such as a power factor correction circuit, and to the power converter apparatus.

BACKGROUND ART

For example, in a power factor correction circuit (hereinafter, it is referred to as a PFC circuit) operating in a current critical mode, a switching element needs to be turned on after an inductor current becomes zero. Therefore, the zero point of the inductor current needs to be accurately detected (see, for example, Non-Patent Document 1).

PRIOR ART DOCUMENT

Patent Document

[Non-Patent Document 1] Qingyun Huang et al., "Predictive ZVS Control with Improved ZVS Time Margin and Limited Variable Frequency Range for A 99% Efficient, 130 W/in3 MHz GaN Totem-Pole PFC Rectifier," IEEE Transactions on Power Electronics, Vol. 34, No. 7, 2018

SUMMARY OF THE INVENTION

Problems to be Solved by the Invention

Conventionally, in an inductor current detector circuit, current detection has been performed using a shunt resistor, an operational amplifier, and a comparator (see, for example, Non-Patent Document 1). Therefore, there has been a problem that the zero detection cannot be accurately performed due to occurrence of a delay of an integrated circuit (IC) and a delay in a noise elimination filter.

FIG. 2 is a timing chart for explaining a delay of the zero detection of an inductor current iL in the current detector circuit in the conventional example. FIG. 2 illustrates an ideal value and an actual value of a comparison result signal for zero detection. In FIG. 2, td represents a delay time of the zero detection occurring due to the delay of the operational amplifier and the noise filter. That is, because the comparator rises with a delay from the current zero detection point of the ideal value due to the delay of the comparator IC and the time constant of the noise filter, a negative current increases as illustrated in FIG. 2.

FIG. 3A is a circuit diagram of a switching power supply apparatus for describing a mechanism in which a loss of the switching power supply apparatus increases due to a delay of the zero detection of the inductor current, and FIG. 3B is a timing chart illustrating an operation of the switching power supply apparatus in FIG. 3A. Referring to FIG. 3A, the switching power supply apparatus includes an alternating-current (AC) power supply 1, an inductor 2, switching elements S1 to S4, a smoothing capacitor 3, and a load resistor 4. FIG. 3B illustrates the inductor current iL, a drain-source voltage Vds of the switching element S2, a drive signal G2 for the switching element S2, and a drive signal G1 for the switching element S1. In this case, T1 indicates a period during which soft switching is performed by the negative current of the inductor current iL.

As illustrated in FIG. 3C and FIG. 3D, the negative current of the inductor current iL flows through a body diode of the switching element S2 due to the delay caused by the soft switching. By this extra negative current flowing, the loss of the switching power supply apparatus increases.

In particular, in the development process of a small and large-capacity power supply, a high frequency and a large current need to be detected, and a solution therefor has been a problem.

An object of the present invention is to solve the above problem and to provide a control circuit of a power converter apparatus, the control circuit being able to accurately detect a zero point of an inductor current in a PFC circuit operating in a current critical mode as compared with the prior art, and to provide the power converter apparatus.

Means for Solving the Problems

According to one aspect of the present invention, there is provided a control circuit for a power converter apparatus including a power factor correction circuit including an inductor and operating in a current critical mode. The control circuit includes first, second and third detector circuits, and a comparator. The first detector circuit detects a current of the inductor, a current corresponding to the current of the inductor, or a current including the current of the inductor, amplifies a voltage corresponding to a detected current with a predetermined gain, and thereafter, outputs an amplified voltage as a detected voltage. The comparator compares the detected voltage with a predetermined reference voltage, and outputs a comparison result signal, the second detector circuit that detects an input voltage of the power converter apparatus, and the third detector circuit that detects an output voltage of the power converter apparatus. The control circuit is configured to calculate a reference voltage for making a delay when detecting a zero value of the current of the inductor be substantially zero, based on the detected input voltage, the detected output voltage, a preset delay time, an inductance value of the inductor, a conversion coefficient used when converting the current detected by the first detector circuit into a voltage, a power supply voltage, and the gain, and to output the reference voltage to the comparator.

Effect of the Invention

Therefore, according to the present invention, in the PFC circuit operating in the current critical mode, the detection delay of the inductor current can be prevented, and the zero point of the inductor current can be accurately detected as compared with the prior art. As a result, the loss of the power converter apparatus is reduced, and this leads to an increase in the density of the power supply apparatus.

BRIEF DESCRIPTION OF THE DRAWINGS

FIG. 4B is a timing chart illustrating an operation of the current detector unit in

FIG. 4A.

MODE FOR CARRYING OUT THE INVENTION

Figure 1A:
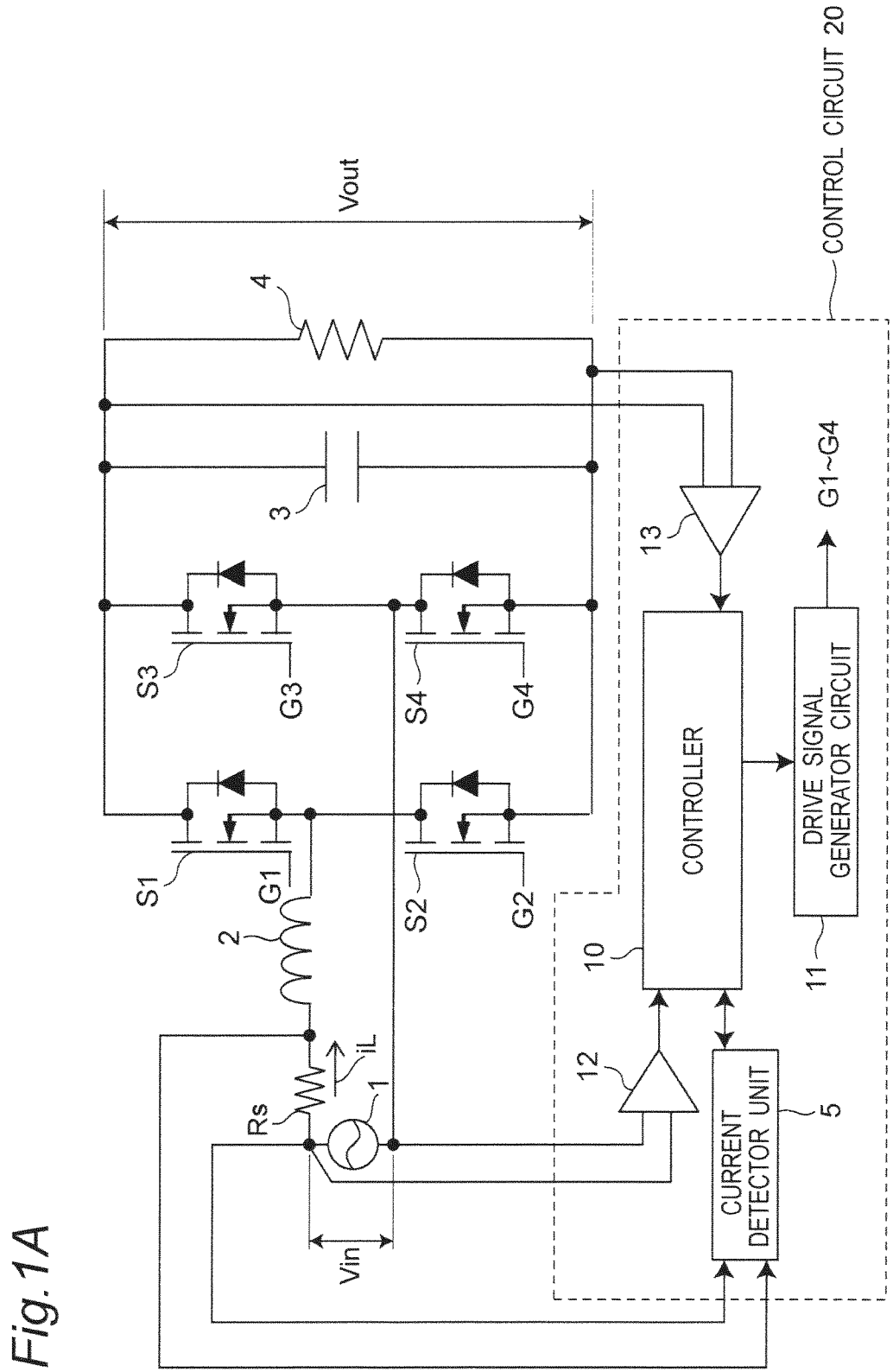
FIG. 1A is a circuit diagram illustrating a configuration example of a switching power supply apparatus including a control circuit 20 according to an embodiment.

Hereinafter, embodiments according to the present invention are described with reference to the drawings. The same or similar components are denoted by the same reference numerals.

FIG. 1A is a circuit diagram illustrating a configuration example of a switching power supply apparatus including a control circuit 20 according to an embodiment.

Referring to FIG. 1A, the switching power supply apparatus according to the present embodiment includes an AC power supply 1, an inductor 2 that is a reactor, bridge-connected switching elements S1 to S4, a smoothing capacitor 3, a load resistor 4, a shunt resistor Rs, and a control circuit 20. In this case, the control circuit 20 includes a controller 10, a current detector unit 5, a drive signal generator circuit 11, an input voltage detector circuit 12, and an output voltage detector circuit 13.

An input voltage Vin generated by the AC power supply 1 is inputted to the bridge-connected circuit of the switching elements S1 to S4 via the shunt resistor Rs and the inductor 2. The switching elements S1 to S4 are controlled to be turned on and off by drive signals G1 to G4 from the drive signal generator circuit 11 to cause the input voltage Vin to be switched, and thereafter, to cause the smoothed DC voltage to be outputted as an output voltage Vout to the load resistor 4 via the smoothing capacitor 3.

The shunt resistor Rs converts an inductor current iL into a voltage value and outputs the voltage value to the current detector unit 5. The input voltage detector circuit 12 detects the input voltage Vin, and outputs the input voltage Vin to the controller 10, and the output voltage detector circuit 13 detects the output voltage Vout, and outputs the output voltage Vout to the controller 10. The controller 10 controls the drive signal generator circuit 11 to generate the drive signals G1 to G4 in, for example, the current critical mode based on the input signals. It is noted that the controller 10 includes a digital-to-analog (D/A) converter 10a that generates a reference voltage Vref determined in advance by a method to be described in detail later.

Figure 1B:
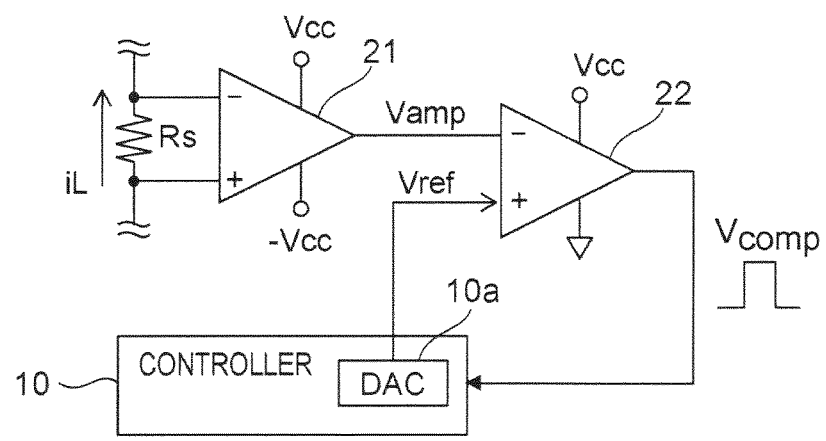
FIG. 1B is a circuit diagram illustrating a configuration example of a current detector unit 5 in FIG. 1A.
Figure 2:
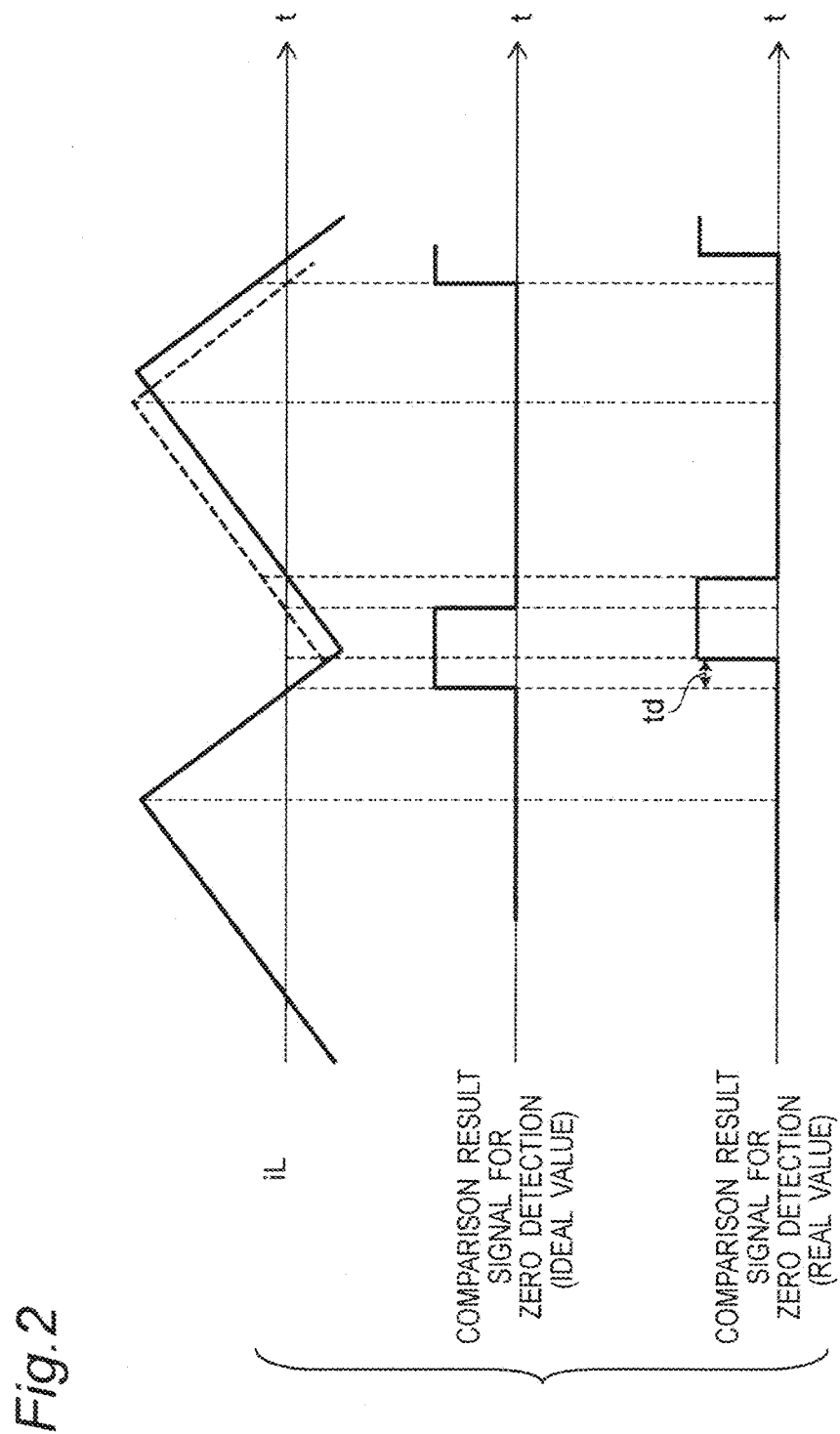
FIG. 2 is a timing chart for explaining a delay of zero detection of an inductor current iL in a current detector circuit in the conventional example.
Figure 3A:
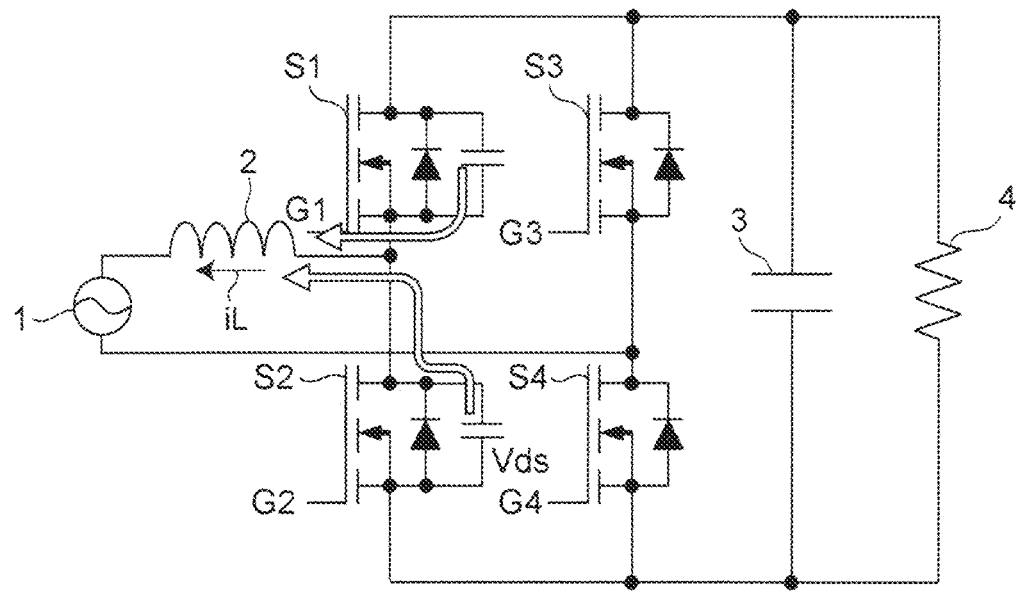
FIG. 3A is a circuit diagram of a switching power supply apparatus for describing a mechanism in which a loss of the switching power supply apparatus increases due to a delay of zero detection of the inductor current.
Figure 3B:
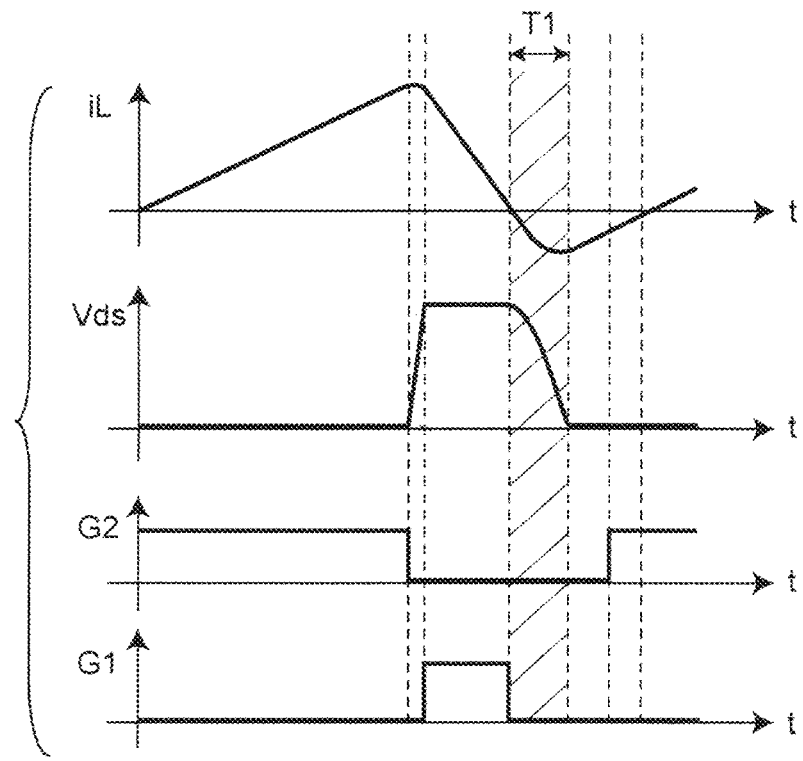
FIG. 3B is a timing chart illustrating an operation of the switching power supply apparatus in FIG. 3A.
Figure 3C:
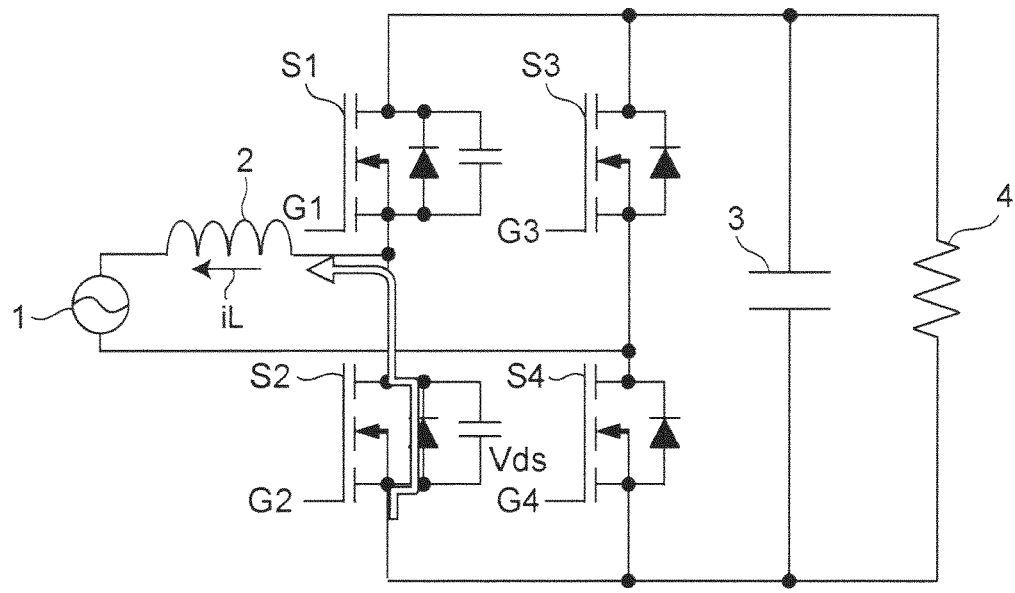
FIG. 3C is a circuit diagram of the switching power supply apparatus for describing a mechanism in which a loss of the switching power supply apparatus increases due to a delay of zero detection of the inductor current.
Figure 3D:
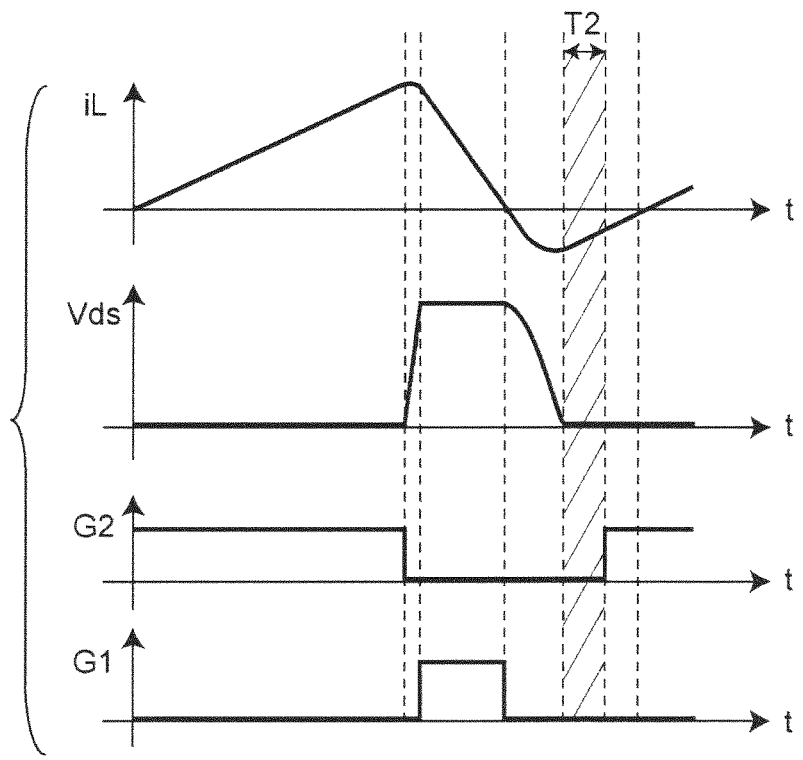
FIG. 3D is a timing chart illustrating an operation of the switching power supply apparatus in FIG. 3C.

FIG. 1B is a circuit diagram illustrating a configuration example of the current detector unit 5 in FIG. 1A. Referring to FIG. 1B, the current detector unit 5 includes an operational amplifier 21 and a comparator 22. It is noted that Vcc is a power supply voltage.

The operational amplifier 21 amplifies a voltage corresponding to the inductor current iL detected by the shunt resistor Rs, and outputs an amplified voltage Vamp to the comparator 22. The comparator 22 compares the amplified voltage Vamp to be inputted with the reference voltage Vref from the D/A converter 10a in the controller 10, generates a comparison result voltage Vcomp, and outputs the comparison result voltage Vcomp to the controller 10. In response to this, the controller 10 detects the zero current of the inductor current iL based on the comparison result voltage Vcomp, and based on this, controls the drive signal generator circuit 11 to perform switching operation in, for example, the current critical mode to generate the drive signals G1 to G4. It is noted that the polarity of the reference voltage Vref is inverted according to the input voltage Vin (FIG. 1A) to the PFC circuit, that is, according to the direction of the inductor current iL.

According to the switching power supply apparatus including the control circuit 20 configured as described above, the detection delay can be prevented by changing the reference voltage Vref of the comparator 22 according to the delay time. As a result, deterioration in efficiency can be prevented, the deterioration being caused by the zero point detection delay of the inductor current iL in the PFC circuit of the critical mode. Hereinafter, the functions and advantageous effects of the present embodiment are described in detail.

Figure 4A:
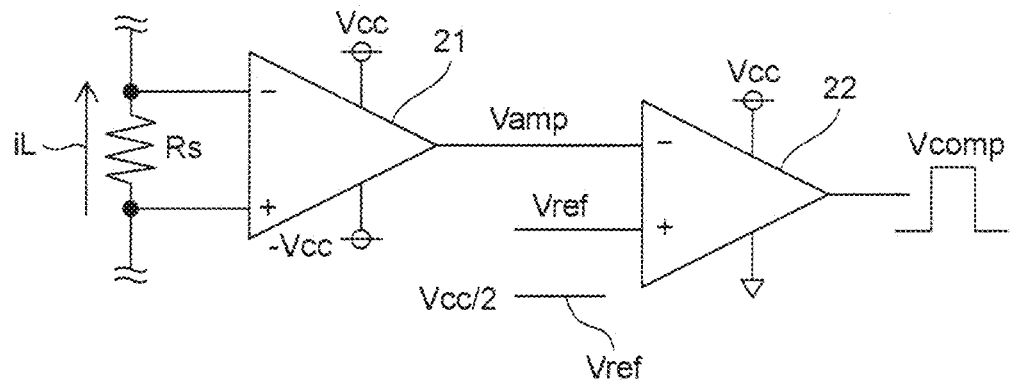
FIG. 4A is a circuit diagram illustrating a configuration example of a current detector unit in the conventional example.
Figure 4B:
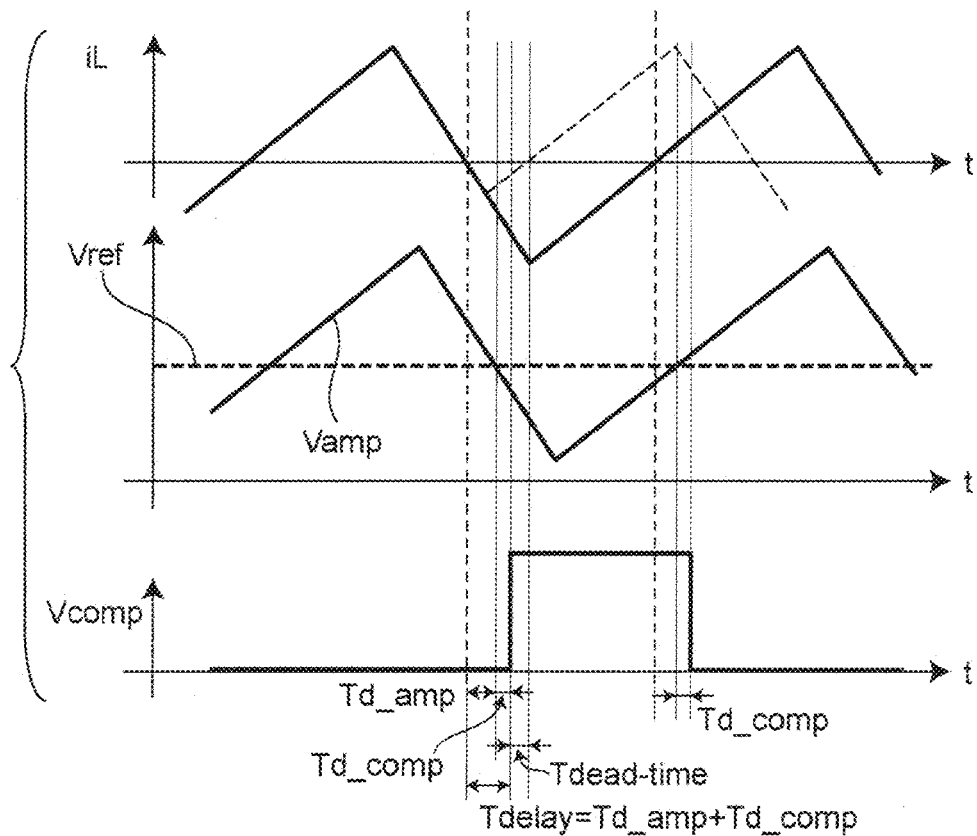

FIG. 4A is a circuit diagram illustrating a configuration example of a current detector unit according to a conventional example, and FIG. 4B is a timing chart illustrating an operation of the current detector unit in FIG. 4A. As illustrated in FIG. 4A, when the reference voltage Vref of the comparator 22 is a constant voltage such as Vcc/2, a delay time Tdelay occurs as illustrated in FIG. 4B.

Figure 4C:
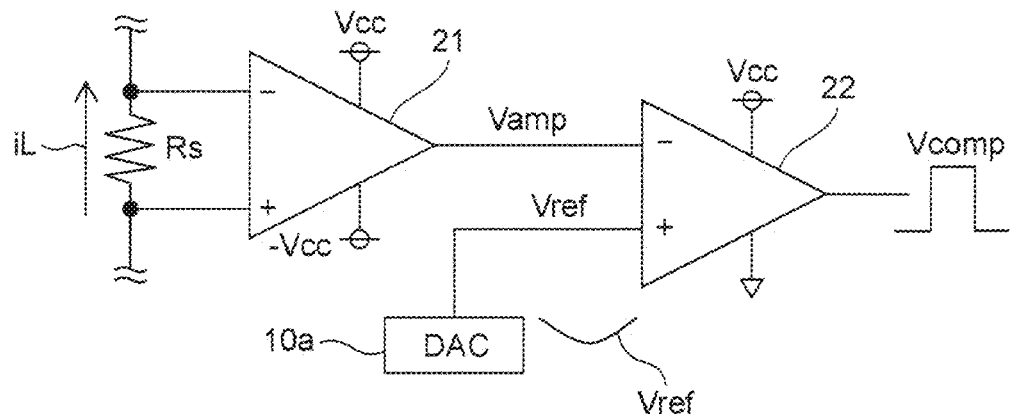
FIG. 4C is a circuit diagram illustrating a configuration example of the current detector unit 5 in the embodiment.
Figure 4D:
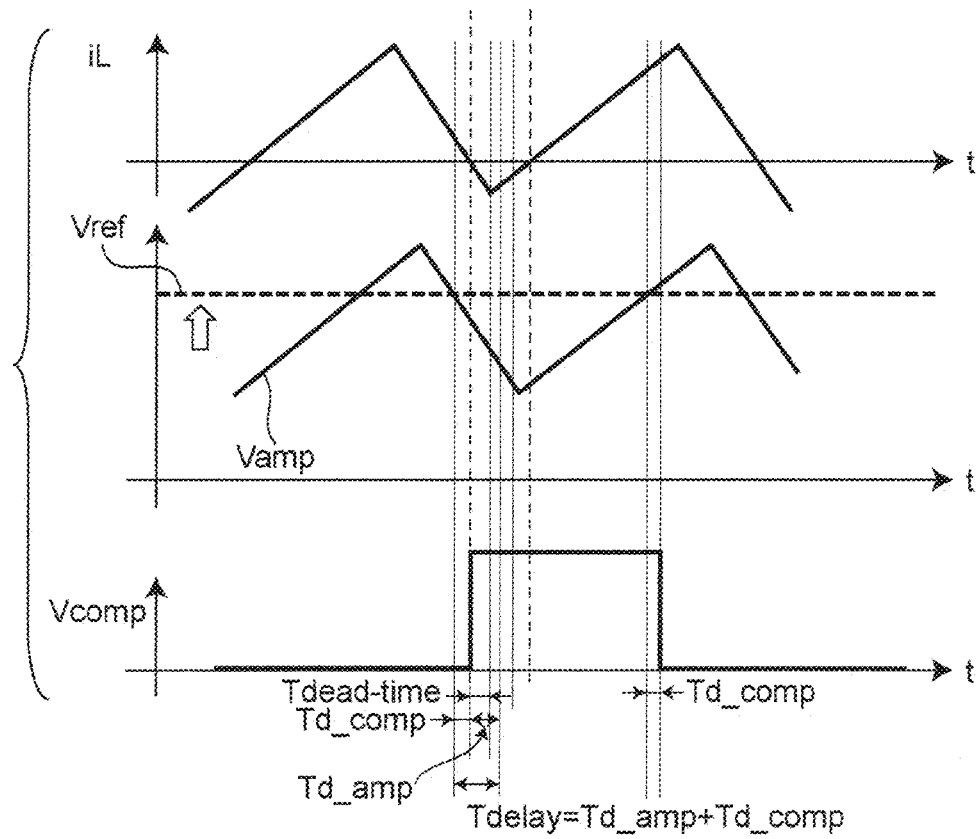
FIG. 4D is a timing chart illustrating an operation of the current detector unit 5 in FIG. 4C.

FIG. 4C is a circuit diagram illustrating a configuration example of the current detector unit 5 according to the embodiment, and FIG. 4D is a timing chart illustrating an operation of the current detector unit 5 in FIG. 4C. As illustrated in FIG. 4C, the reference voltage Vref from the D/A converter 10a of the controller 10 is increased according to the delay time. That is, in the PFC circuit in which the input voltage is alternating current (AC), by changing the reference voltage Vref depending on the input voltage Vin, the delay time Tdelay can be reduced as illustrated in FIG. 4D, by comparison with FIG. 4B. In FIG. 4D, (1) Td_amp is a delay time due to the amplification operation of the operational amplifier 21, (2) Td_comp is a delay time due to the comparison operation of the comparator 22, and (3) Tdead-time is a dead time of the switching elements S1 and S2.

Figure 5:
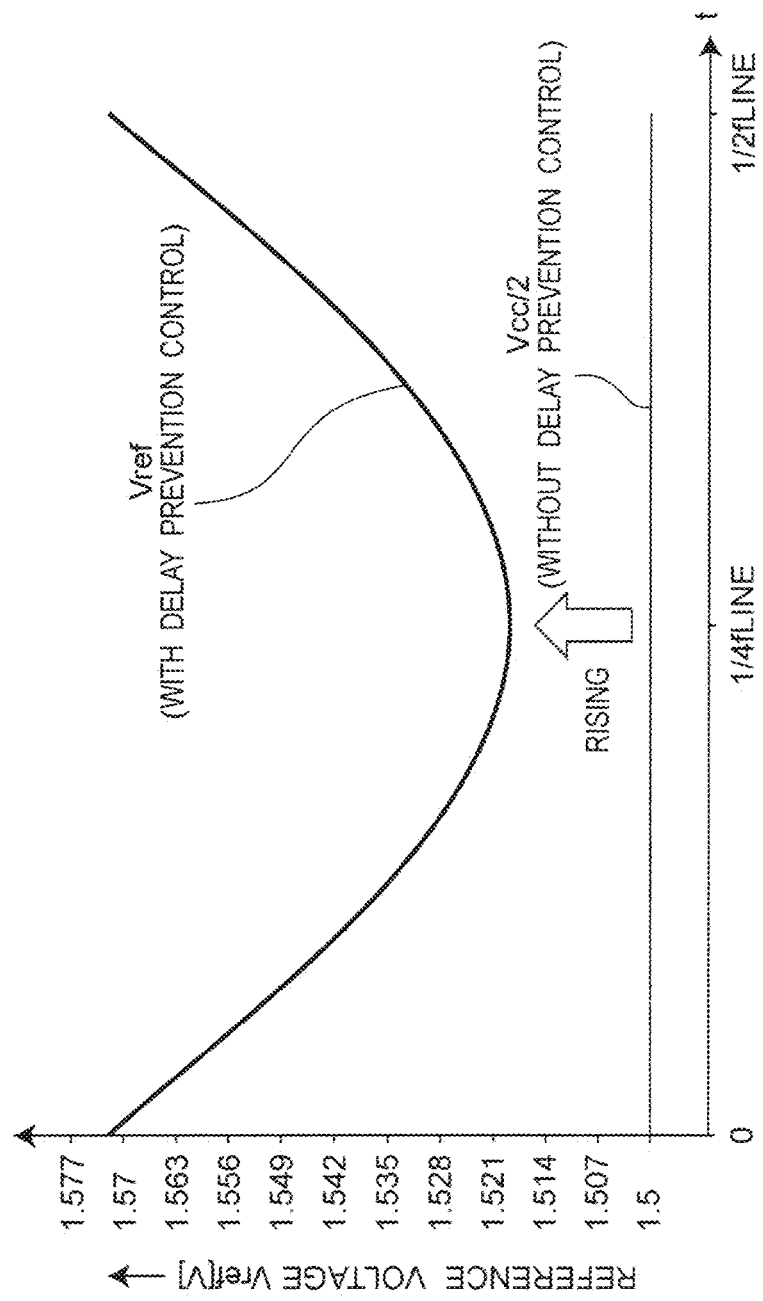
FIG. 5 is a graph illustrating an operation of the current detector unit 5 according to the embodiment.

FIG. 5 is a graph illustrating an operation of the current detector unit 5 according to the embodiment. FIG. 5 illustrates an example of the reference voltage Vref (a half cycle of the input voltage Vin) when, for example, Vcc=3 V, Tdelay=50 ns, Vin(rms)=200 V, and $f_{LINE}$=50 Hz. The delay time Tdelay can be reduced by feeding back and input the reference voltage Vref derived from the delay time Tdelay to the comparator 22 of the current detector unit 5 by using the current detector unit 5 and the controller 10 in FIGS. 1B and 4C.

Hereinafter, an example of a method of deriving the reference voltage Vref is described.

Figure 6:
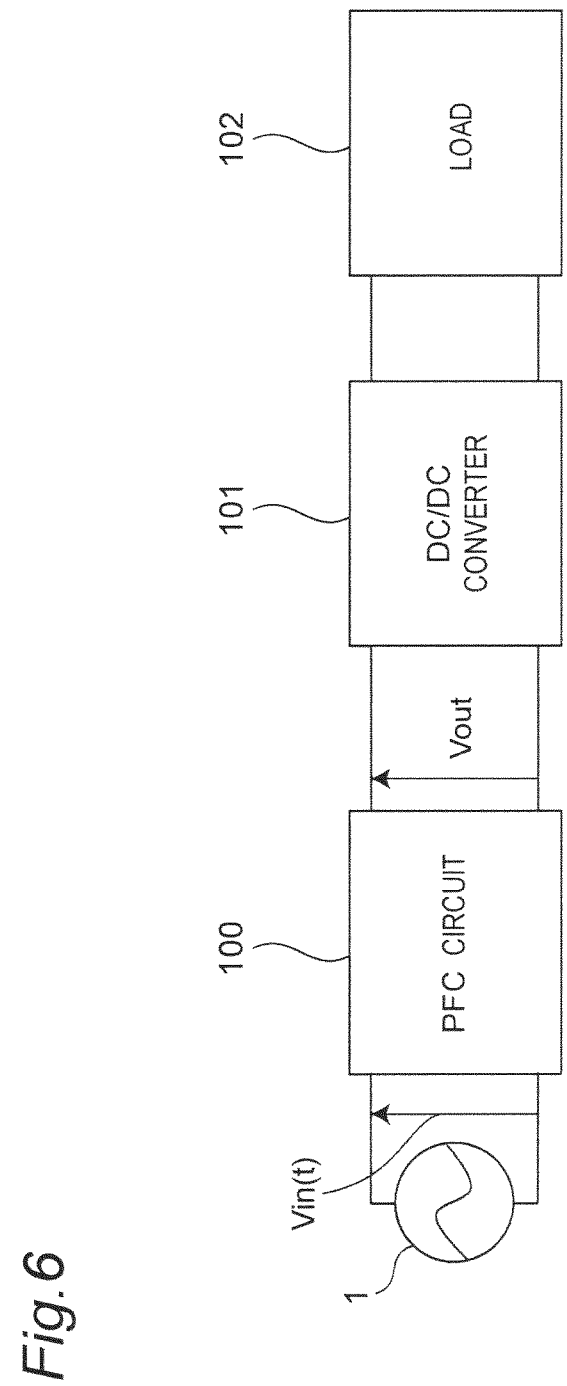
FIG. 6 is a block diagram illustrating a configuration example of a power converter apparatus using a PFC circuit according to the embodiment.

FIG. 6 is a block diagram illustrating a configuration example of a power converter apparatus using the PFC circuit according to the embodiment. Referring to FIG. 6, the power converter apparatus includes the AC power supply 1, a PFC circuit 100, a direct current to direct current (DC to DC) converter 101, and a load 102. Because the control target is the PFC circuit, the input AC voltage and the output DC voltage are referred to as Vin(t) and Vout, respectively. The input voltage Vin(t) is expressed by the following equation.

$$Vin(t) = \sqrt{2}\, Vin(\text{rms}) \times \sin(2\pi f_{LINE} t) \quad \text{[Mathematical Equation 1]}$$

In this case, the input voltage Vin(rms) and the line frequency $f_{LINE}$ vary depending on the country or region, and examples thereof are as follows.

$$Vin(\text{rms}) = 100 \text{ V}, 200 \text{ V}, 230 \text{ V}$$

$$f_{LINE} = 50 \text{ Hz or } 60 \text{ Hz}$$

When the current detector unit 5 of FIGS. 1B and 4C is used, a resistance value of the shunt resistor Rs is denoted as Rs, a gain of the operational amplifier 21 is denoted as G, and a voltage applied to the operational amplifier 21 and the comparator 22 is denoted as Vcc.

Figure 7:
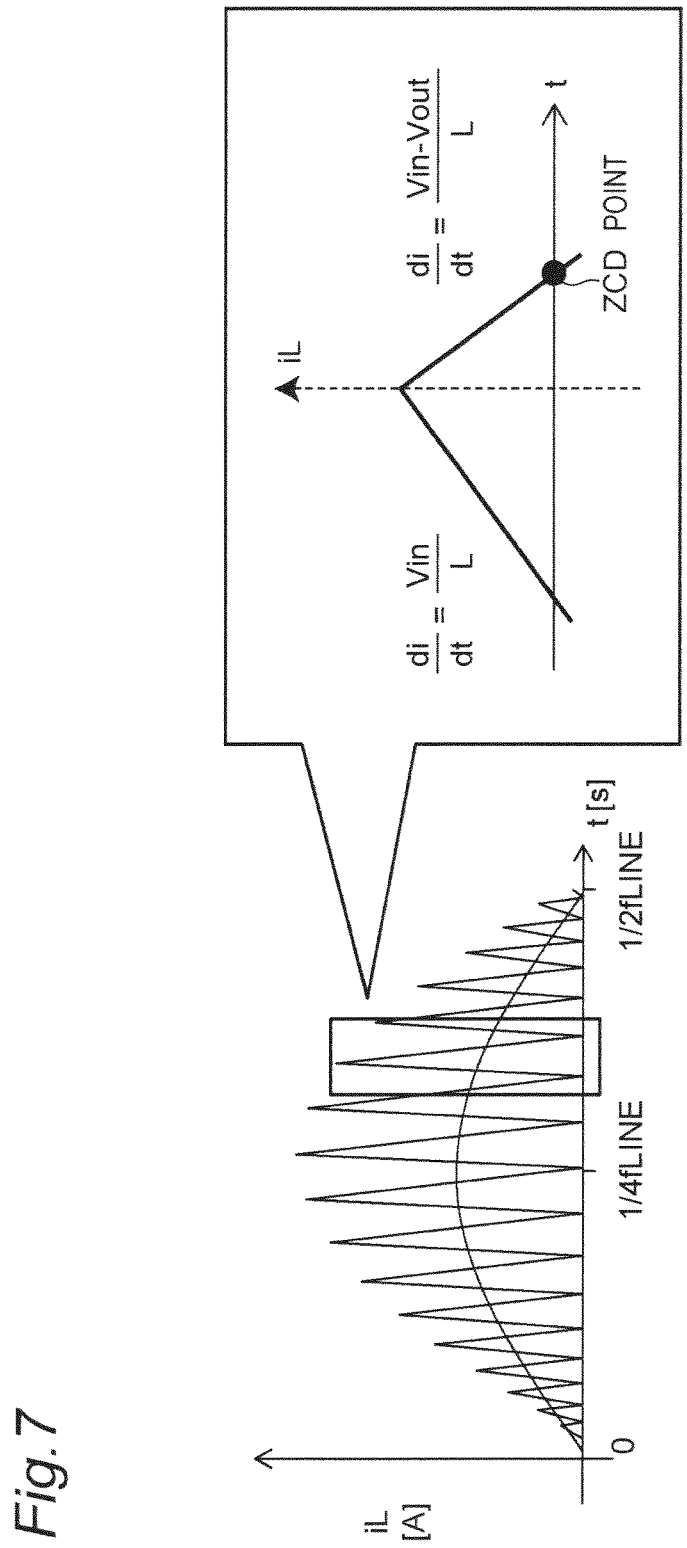
FIG. 7 is a waveform chart for explaining a method of deriving a reference voltage Vref used in the current detector unit 5 according to the embodiment.

FIG. 7 is a waveform chart for explaining a method of deriving the reference voltage Vref used in the current detector unit 5 according to the embodiment.

The inductor current iL in the half cycle of the input voltage Vin is as illustrated in the graph of FIG. 7, and an enlarged view of one switching cycle is illustrated on the right side. In this case, a slope of the inductor current iL is obtained by vin(t), Vout, and an inductance value L. Based on the delay time Tdelay in the zero current detection, a current variation amount Δidelay that changes during the delay time is expressed by the following equation.

$$\Delta i_{delay} = \frac{V_{out} - v_{in}(t)}{L} T_{delay} \quad \text{[Mathematical Equation 2]}$$

The zero current may be detected earlier by the current variation amount Δidelay. Because the conversion into a voltage can be performed by multiplying the current variation amount Δidelay by the resistance value Rs of the shunt resistor and the gain G of the operational amplifier 21, the reference voltage Vref in consideration of the delay time is expressed by the following equation:

$$V_{ref} = \frac{V_{out} - v_{in}(t)}{L} T_{delay} \cdot R_{shunt} \cdot G + \frac{Vcc}{2} \quad \text{[Mathematical Equation 3]}$$

Figure 8A:
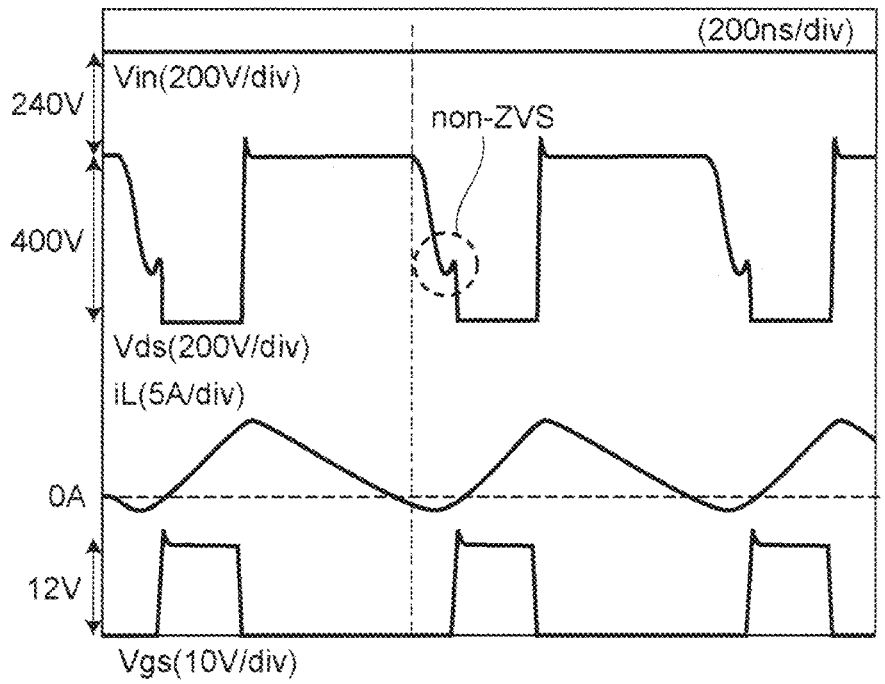
FIG. 8A is a waveform chart for explaining soft switching of the PFC circuit by the current detector unit 5 according to the embodiment.
Figure 8B:
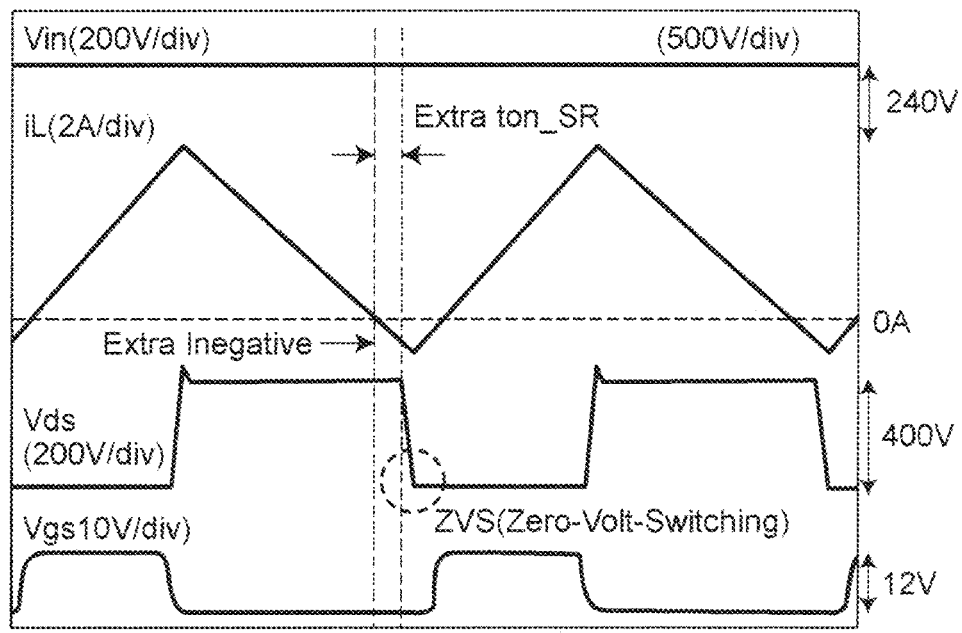
FIG. 8B is a waveform chart for explaining soft switching of the PFC circuit by the current detector unit 5 according to the embodiment.

FIGS. 8A and 8B are waveform charts for explaining soft switching of the PFC circuit by the current detector unit 5 according to the embodiment. In this case, FIG. 8A is the waveform chart when Vin>Vout/2, and FIG. 8B is the waveform chart when additional on-time control is performed.

In the present embodiment, a known triangular current mode (TCM) control method is used to perform the TCM control only by changing the reference voltage Vref of the comparator 22. In FIGS. 8A and 8B, reference numerals are defined as follows.

Vin: Input voltage
Vds: Drain-source voltage of main switching element
iL: Inductor current
Vgs: Gate-source voltage of main switching element In the above embodiment, the controller 10 calculates the reference voltage Vref for making the delay at the time of detecting the zero value of the inductor current iL substantially zero based on the detected input voltage Vin and output voltage Vout, the preset delay time, the inductance value of the inductor 2, the resistance value of the shunt resistor Rs (in modified embodiments described later, this is a conversion coefficient when the inductor current iL at the time of current detection is converted into a voltage, and is generally the conversion coefficient), the power supply voltage Vcc, and the gain of the operational amplifier 21, and outputs the reference voltage Vref to the comparator 22. With this configuration, in the power converter apparatus including the PFC circuit operating in the current critical mode, the detection delay of the inductor current can be prevented, and the zero point of the inductor current can be accurately detected as compared with the prior art.

Under the condition of Vin>Vout/2 in FIG. 8A, the negative current for pulling out the charge of the switching element is insufficient, and the soft switching cannot be performed. Therefore, by using the TCM control method, the synchronous rectification switching element is kept to be turned on for a predetermined additional time α [ns] from the zero current detection point, and this causes the negative current for extracting the charge to flow.

In the soft switching method illustrated in FIGS. 8A and 8B, the negative current necessary for the soft switching flows by continuously turning on the switching element for +α[ns] and giving the additional ON-time. However, as is described below with reference to FIG. 9, adjustment can also be performed to cause the negative current necessary for the soft switching to flow by changing the reference voltage Vref.

Figure 9:
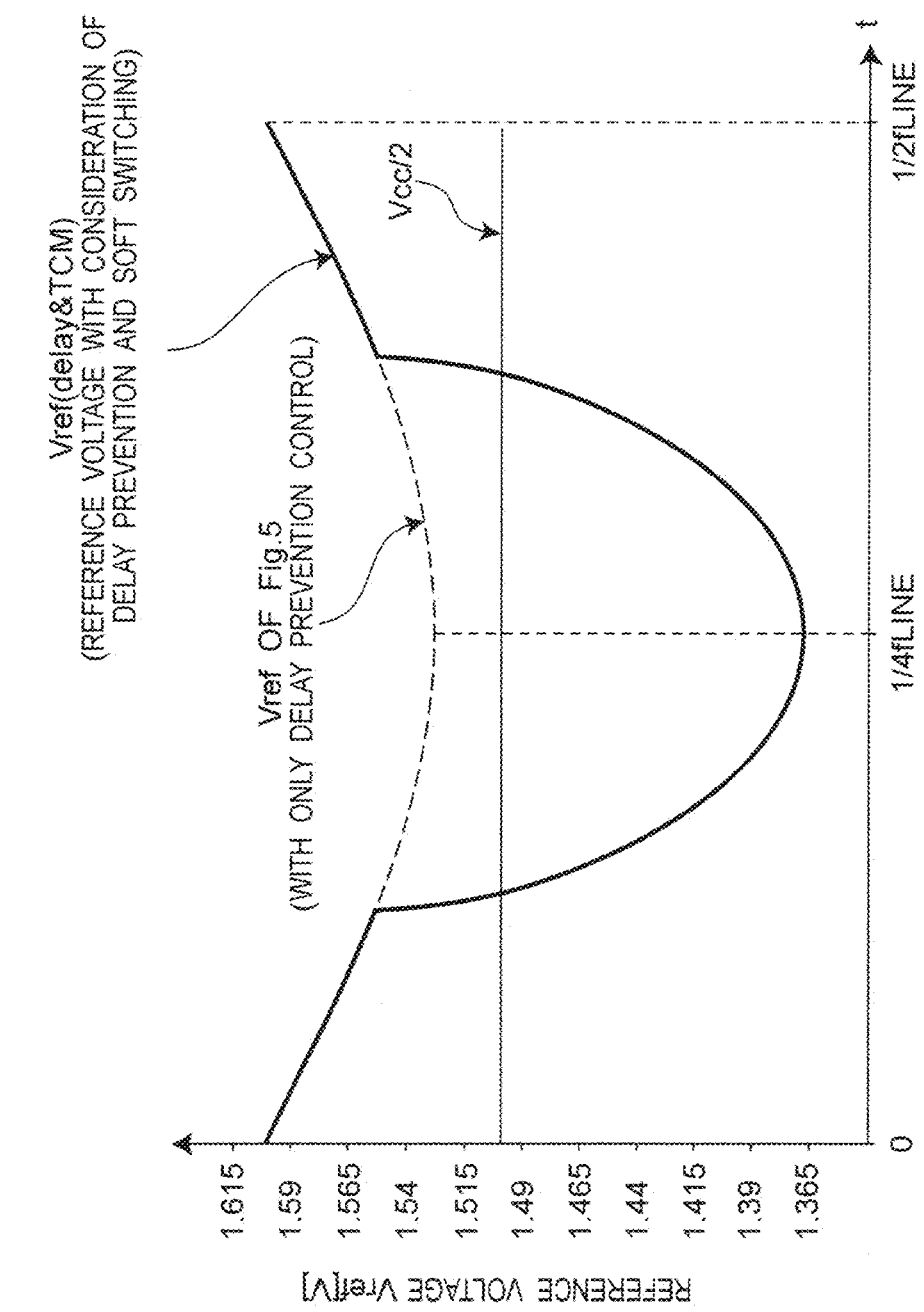
FIG. 9 is a waveform chart for explaining a method of deriving a reference voltage Vref used in a current detector unit 5 according to a modified embodiment.

FIG. 9 is a waveform chart for explaining a method of deriving the reference voltage Vref used in a current detector unit 5 according to a modified embodiment. As illustrated in FIG. 9, as compared to the reference voltage Vref in FIG. 5 in which only the delay prevention control is performed, the reference voltage Vref is lowered, for example, in an elliptical shape only for a predetermined time period. In this case, the negative current necessary for the soft switching can be obtained from the input voltage Vin, the output voltage Vout, and the inductance L of the inductor 2, the above reference voltage Vref can be realized by adding the negative current to the reference voltage Vref in consideration of the delay time.

Figure 10A:
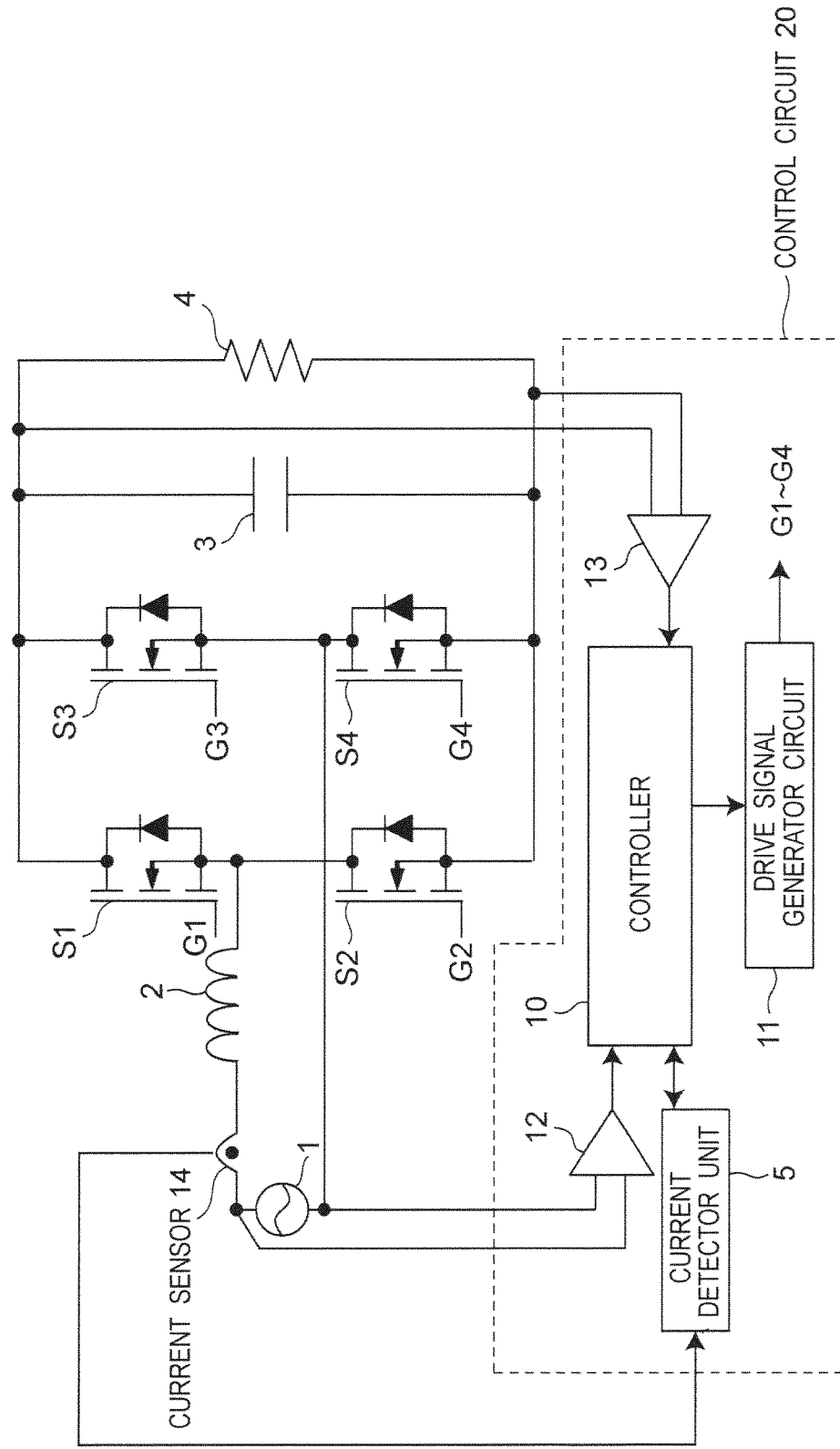
FIG. 10A is a block diagram illustrating a configuration example of a switching power supply apparatus according to a first modified embodiment.

FIG. 10A is a block diagram illustrating a configuration example of a switching power supply apparatus according to a first modified embodiment. In the embodiment of FIG. 1A, the inductor current iL flowing through the shunt resistor Rs is detected, but the present invention is not limited thereto, and as illustrated in FIG. 10A, the inductor current iL may be detected using a current sensor 14 such as a current transformer (CT), a Hall element, or a giant magneto resistive effect (GMR) element.

Figure 10B:
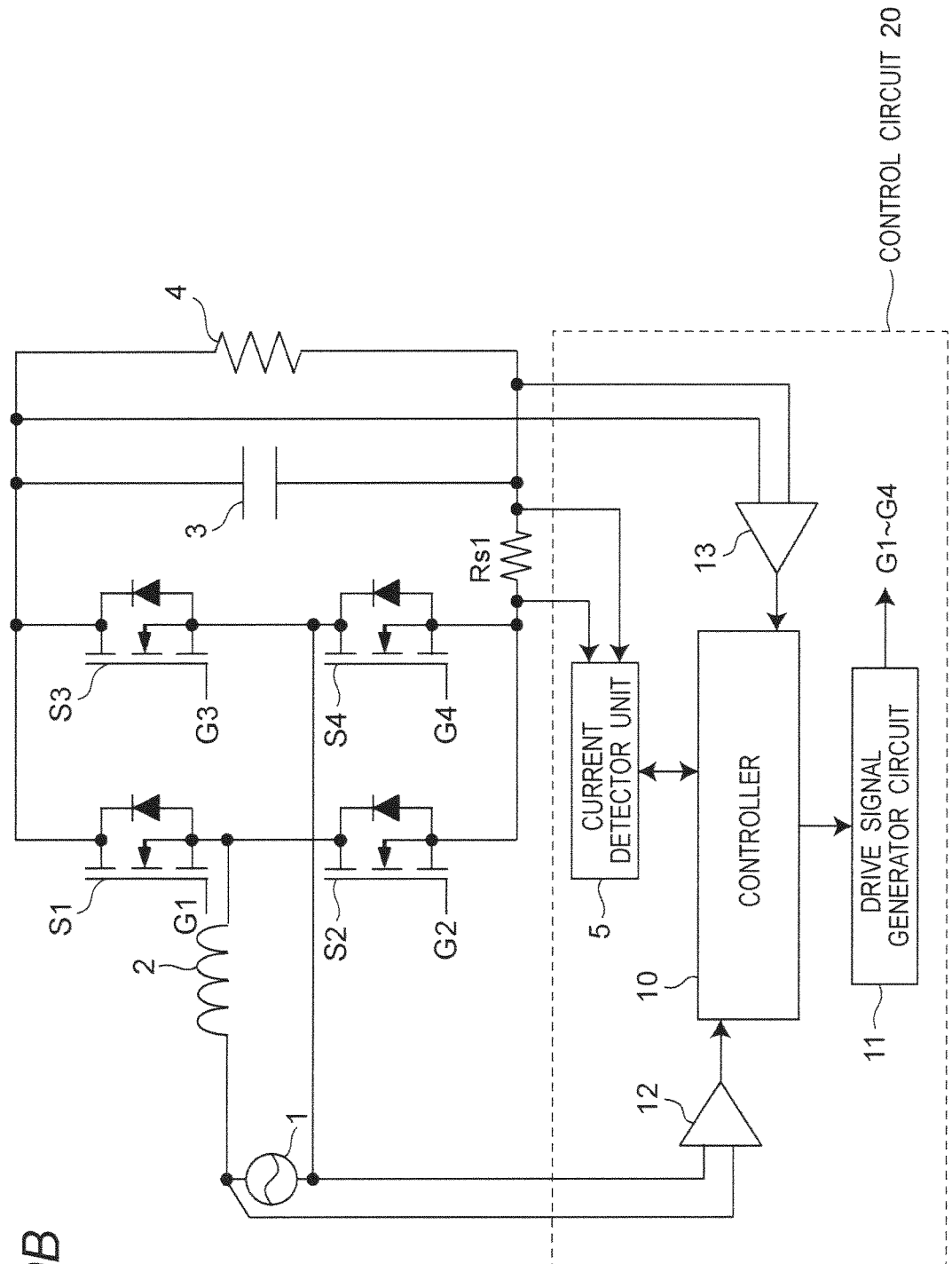
FIG. 10B is a block diagram illustrating a configuration example of a switching power supply apparatus according to a second modified embodiment.

FIG. 10B is a block diagram illustrating a configuration example of a switching power supply apparatus according to a second modified embodiment. In FIG. 10B, a shunt resistor Rs1 may be inserted between the ground side of switching elements S2 and S4 and a load resistor 4 to detect the zero point of the inductor current iL.

Figure 11A:
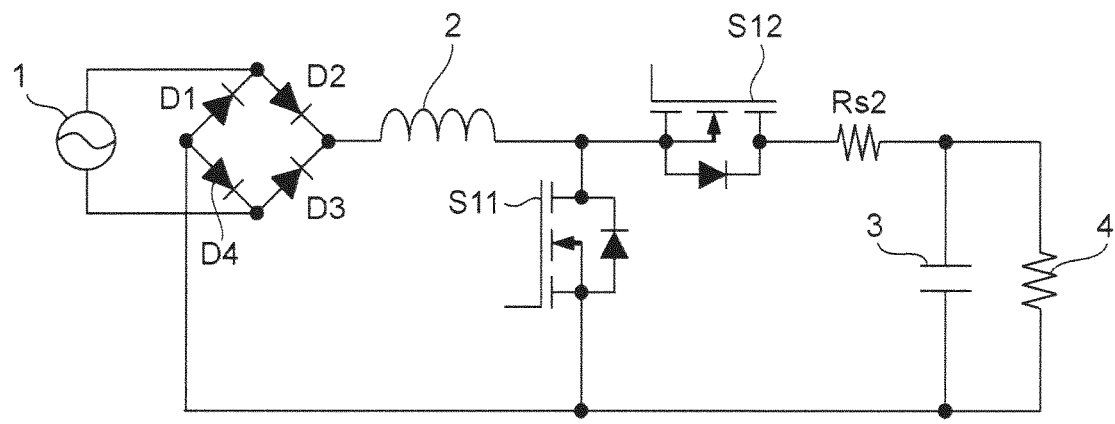
FIG. 11A is a block diagram illustrating a configuration example of a switching power supply apparatus according to a third modified embodiment.

FIG. 11A is a block diagram illustrating a configuration example of a switching power supply apparatus according to a third modified embodiment. FIG. 11A illustrates an example of a synchronous rectification step-up PFC circuit. Referring to FIG. 11A, the switching power supply apparatus is configured by including an AC power supply 1, four bridge-connected diodes D1 to D4, an inductor 2 that is a reactor, switching elements S11 and S12, a shunt resistor Rs2, a smoothing capacitor 3, and a load resistor 4. Referring to FIG. 11A, in the synchronous rectification step-up PFC circuit, when the present embodiment is applied, the shunt resistor Rs2 for detecting the zero point of the inductor current iL is preferably inserted between the switching element S12 and the smoothing capacitor 3.

Figure 11B:
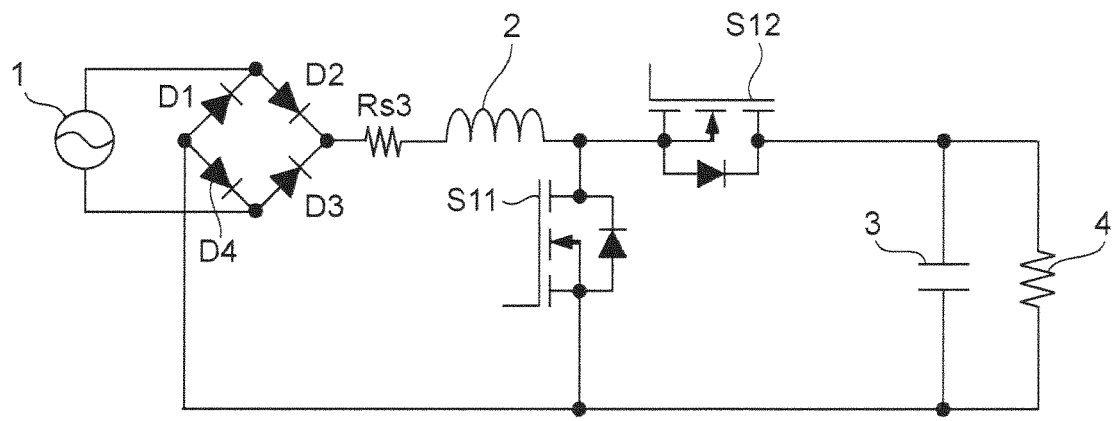
FIG. 11B is a block diagram illustrating a configuration example of a switching power supply apparatus according to a fourth modified embodiment.

FIG. 11B is a block diagram illustrating a configuration example of a switching power supply apparatus according to a fourth modified embodiment. In the fourth modified embodiment in FIG. 11B, instead of the third modified embodiment in FIG. 11A, a shunt resistor Rs3 for detecting the zero point of the inductor current iL may be inserted between diodes D1 and D4 and an inductor 2.

In the above-described second to fourth modified embodiments, a current corresponding to the inductor current iL or a current including the inductor current iL is detected.

Figure 12:
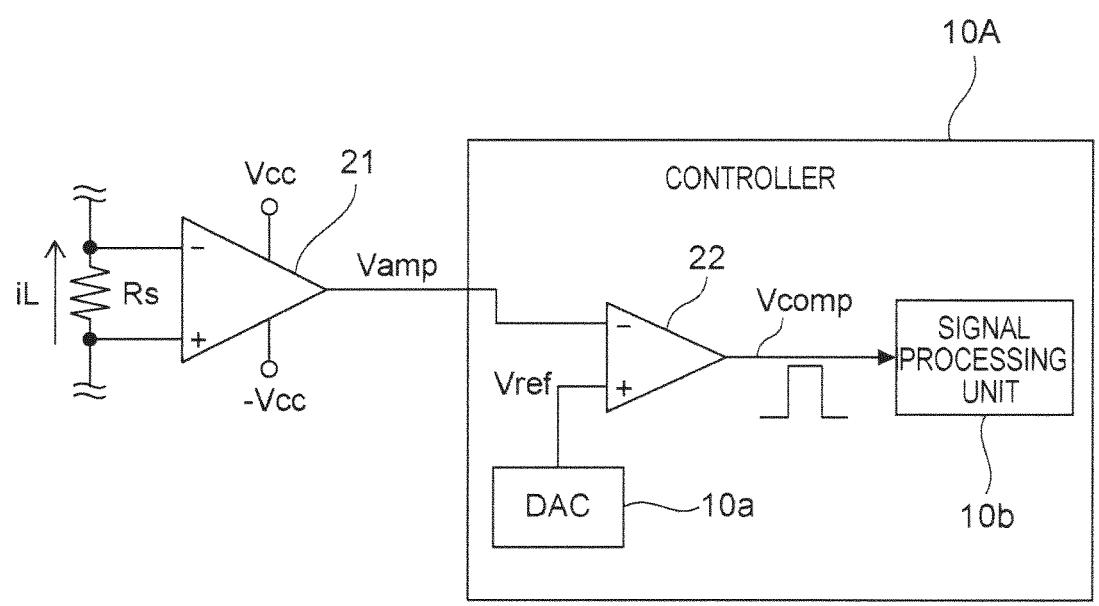
FIG. 12 is a circuit diagram illustrating a modified embodiment of a current detector unit 5 in FIG. 1B.

FIG. 12 is a circuit diagram illustrating a modified embodiment of the current detector unit 5 in FIG. 1B. Referring to FIG. 12, a controller 10A including a D/A converter 10a, a comparator 22, and a signal processing unit 10b is provided instead of the controller 10. In this case, the signal processing unit 10b performs signal processing of changing the reference voltage Vref based on the comparison result voltage Vcomp from the comparator 22.

Some controllers such as a digital signal processor (DSP) incorporate not only an A/D converter and a D/A converter but also a function of a comparator. By using the built-in comparator 22, there is an advantage that an external comparator IC becomes unnecessary.

As described above, according to the embodiment and the modified embodiment, in the power converter apparatus including the PFC circuit operating in the current critical mode, the detection delay of the inductor current can be prevented, and the zero point of the inductor current can be accurately detected as compared with the prior art. As a result, the loss of the power converter apparatus is reduced, leading to an increase in the density of the power supply apparatus. In particular, because no magnetic body is used, the loss does not increase even when high-frequency driving is performed, and no additional component is required. In addition, if the method of changing the reference voltage Vref is applied, a soft switching function using voltage resonance can be easily implemented.

Although the switching power supply apparatus has been described in the above embodiment or modified embodiment, the present invention is not limited thereto, and can be applied to various power converter apparatuses including the switching power supply apparatus.

INDUSTRIAL APPLICABILITY

As mentioned above in detail, according to the present invention, in the PFC circuit operating in the current critical mode, the detection delay of the inductor current can be prevented, and the zero point of the inductor current can be accurately detected as compared with the prior art. As a result, the loss of the power converter apparatus is reduced, and this leads to an increase in the density of the power supply apparatus.

The invention claimed is:

1. A control circuit for a power converter apparatus comprising a power factor correction circuit including an inductor and operating in a current critical mode, the control circuit comprising:
   a first detector circuit that detects a current of the inductor, a current corresponding to the current of the inductor, or a current including the current of the inductor, amplifies a voltage corresponding to a detected current with a predetermined gain, and thereafter, outputs an amplified voltage as a detected voltage;
   a comparator that compares the detected voltage with a predetermined reference voltage, and outputs a comparison result signal;
   a second detector circuit that detects an input voltage of the power converter apparatus; and
   a third detector circuit that detects an output voltage of the power converter apparatus,
   wherein the control circuit is configured to calculate a reference voltage for making a delay when detecting a substantially zero value of the current of the inductor be substantially zero, based on the detected input voltage, the detected output voltage, a preset delay time, an inductance value of the inductor, a conversion coefficient used when converting the current detected by the first detector circuit into the voltage, a power supply voltage, and the gain, and to output the reference voltage to the comparator.

2. The control circuit for the power converter apparatus as claimed in claim 1,
wherein the control circuit calculates the reference voltage in consideration of a negative current required for soft switching of the power converter apparatus.

3. The control circuit for the power converter apparatus as claimed in claim 1,
wherein the control circuit is configured to generate the reference voltage calculated by the control circuit, and
wherein the control circuit incorporates a digital to analog (D/A) converter that performs D/A conversion on the reference voltage generated by the control circuit.

4. A power converter apparatus comprising a control circuit, the control circuit comprising:
a power factor correction circuit including an inductor and operating in a current critical mode;
a first detector circuit that detects a current of the inductor, a current corresponding to the current of the inductor, or a current including the current of the inductor, amplifies a voltage corresponding to a detected current with a predetermined gain, and thereafter, outputs an amplified voltage as a detected voltage;
a comparator that compares the detected voltage with a predetermined reference voltage, and outputs a comparison result signal;
a second detector circuit that detects an input voltage of the power converter apparatus; and
a third detector circuit that detects an output voltage of the power converter apparatus,
wherein the control circuit is configured to calculate a reference voltage for making a delay when detecting a substantially zero value of the current of the inductor be substantially zero, based on the detected input voltage, the detected output voltage, a preset delay time, an inductance value of the inductor, a conversion coefficient used when converting the current detected by the first detector circuit into the voltage, a power supply voltage, and the gain, and to output the reference voltage to the comparator.

5. The power converter apparatus as claimed in claim 4,
wherein the power converter apparatus is a switching power supply apparatus or a direct current to direct current (DC to DC) converter apparatus.

* * * * *